United States Patent
Yan et al.

(10) Patent No.: US 9,343,970 B2
(45) Date of Patent: May 17, 2016

(54) CONVERTER AND METHOD FOR REDUCING A VOLTAGE OF NODE THEREOF

(71) Applicant: Delta Electronics (Shanghai) Co., Ltd., Shanghai (CN)

(72) Inventors: Chao Yan, Shanghai (CN); Wei-Qiang Zhang, Shanghai (CN); Li-Zhi Xu, Shanghai (CN); Xin-Lei Li, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 236 days.

(21) Appl. No.: 14/270,365

(22) Filed: May 6, 2014

(65) Prior Publication Data
US 2015/0049517 A1  Feb. 19, 2015

(30) Foreign Application Priority Data
Aug. 16, 2013 (CN) .......................... 2013 1 0359208

(51) Int. Cl.
*H02M 3/335* (2006.01)
*H02M 3/156* (2006.01)
*H02M 1/00* (2006.01)

(52) U.S. Cl.
CPC .......... *H02M 3/335* (2013.01); *H02M 3/33523* (2013.01); *H02M 3/33553* (2013.01); *H02M 3/33569* (2013.01); H02M 3/156 (2013.01); H02M 3/33584 (2013.01); H02M 2001/007 (2013.01); H02M 2001/0058 (2013.01); Y02B 70/1491 (2013.01)

(58) Field of Classification Search
CPC ...................... H02M 3/33523; H02M 3/33553; H02M 3/33569; H02M 3/335–3/3388
See application file for complete search history.

(56) References Cited

U.S. PATENT DOCUMENTS

| | | | | |
|---|---|---|---|---|
| 4,184,197 A * | 1/1980 | Cuk | ................... | H02M 3/33538 363/16 |
| 5,946,206 A * | 8/1999 | Shimizu | ................ | H02M 3/285 363/16 |
| 7,110,268 B2 * | 9/2006 | Yasumura | ........... | H02M 3/3376 363/21.03 |
| 2002/0114176 A1 * | 8/2002 | Morita | ................... | H02M 1/126 363/95 |
| 2010/0328968 A1 * | 12/2010 | Adragna | ............... | H02M 3/335 363/21.02 |
| 2013/0188397 A1 * | 7/2013 | Wu | ................... | H02M 3/33576 363/17 |
| 2014/0204624 A1 * | 7/2014 | Djenguerian | ..... | H02M 3/33523 363/21.12 |

FOREIGN PATENT DOCUMENTS

| | | |
|---|---|---|
| CN | 103219881 A | 7/2013 |
| CN | 103296989 A | 9/2013 |
| RU | 2302071 C2 | 6/2007 |

* cited by examiner

*Primary Examiner* — Timothy J Dole
*Assistant Examiner* — Ishrat Jamali
(74) *Attorney, Agent, or Firm* — CKC & Partners Co., Ltd.

(57) ABSTRACT

A converter and method for reducing voltage of node thereof are disclosed herein. The converter includes a first transmitting circuit and a second transmitting circuit. The first transmitting circuit is configured to receive a first AC voltage. The second transmitting circuit is electrically coupled to the first transmitting circuit and the second transmitting circuit is configured to transmit a second AC voltage according to the first AC voltage. One of the first transmitting circuit and the second transmitting circuit includes at least one divider unit and the other one of the first transmitting circuit and the second transmitting circuit includes at least two divider units. Each of the divider units includes an inductor network and a capacitor network coupled in series. The inductor network and the capacitor network of the adjacent divider units are coupled in series alternately.

24 Claims, 10 Drawing Sheets

CONVERTER AND METHOD FOR REDUCING A VOLTAGE OF NODE THEREOF

RELATED APPLICATIONS

This application claims priority to China Application Serial Number 201310359208.8, filed Aug. 16, 2013, which is herein incorporated by reference.

BACKGROUND

1. Field of Invention

The present invention relates to a converter. More particularly, the present invention relates to a converter, which reduces the voltage between any two nodes.

2. Description of Related Art

The technology of wireless power transmission is applied in many fields recently, for example, electric vehicle, consumer electronic device, etc. The technology of wireless power transmission transmits power by using a theory of electromagnetic induction.

Referring to FIG. 1, FIG. 1 is a schematic diagram of a known converter. As shown in FIG. 1, the known converter 100 includes a voltage transformer 120, a full bridge inverter circuit 140, a primary side compensation capacitor Cp and a secondary side compensation capacitor Cs. The voltage transformer 120 is formed by coupling the primary side inductor L1 and the secondary side inductor L2, in which a mutual inductance between these inductors is M. The full bridge inverter circuit 140 includes switches S1~S4 and the bridge rectifier 160 includes diodes D1~D4. The full bridge inverter circuit 140 transforms an input DC voltage Vin into an AC voltage and transmits it to the voltage transformer 120. Then, the AC voltage is transmitted to the bridge rectifier 160 through the primary side inductor L1 and the secondary side inductor L2, and the output DC voltage $V_{DC,out}$ is generated. Furthermore, because air gaps generally existed between the primary side inductor L1 and the secondary side inductor L2, the leakage inductance is relatively large. As a result, the output voltage of the voltage transformer 120 is reduced. Therefore, the known converter 100 generally includes the primary side compensation capacitor Cp and the secondary side compensation capacitor Cs to compensate the leakage inductance of the voltage transformer.

In the prior art, when the known converter 100 is operated in a high output power, the current of the primary side and the secondary side are increased with the output power. Accordingly, the voltage of the nodes of the primary/secondary inductors L1/L2 is significantly increased, and the voltage of the primary/secondary side compensation capacitors Cp/Cs is relatively high. Thus, in order to enhance the operation safety, it is necessary to select inductors and capacitors with high voltage withstanding ability, and thus the cost of the converter is increased.

Therefore, it is a major development target to efficiently reduce the voltage of the nodes in a converter in the situation of high output power.

SUMMARY

One aspect of this disclosure is to provide a converter and method for reducing voltage of node thereof.

This disclosure provides a converter including a first transmitting circuit and a second transmitting circuit. The first transmitting circuit is configured to receive a first AC voltage. The second transmitting circuit is electrically coupled to the first transmitting circuit and the second transmitting circuit is configured to generate a second AC voltage according to the first AC voltage. One of the first transmitting circuit and the second transmitting circuit includes at least one divider unit and the other one of the first transmitting circuit and the second transmitting circuit includes at least two divider units. Each of the divider units includes an inductor network and a capacitor network coupled in series. The inductor network and the capacitor network of the adjacent divider units are coupled in series alternately.

According to one embodiment of this disclosure, the inductor network includes an inductor, a transformer winding, an inductor unit having a plurality of inductors coupled in parallel or series, an inductor unit having a plurality of transformer windings coupled in parallel or series, or an inductor unit having a plurality of inductors and transformer windings.

According to one embodiment of this disclosure, the capacitor network includes a capacitor or a capacitor unit having a plurality of capacitors coupled in parallel or series.

According to one embodiment of this disclosure, inductance values of the inductor networks in each of the divider units are the same as each other.

According to one embodiment of this disclosure, inductance values of the inductor networks in each of the divider units are different from each other.

According to one embodiment of this disclosure, capacitance values of the capacitor networks in each of the divider units are different from each other.

According to one embodiment of this disclosure, capacitance values of the capacitor networks in each of the divider units are same as each other.

According to one embodiment of this disclosure, the converter further includes a first converting circuit and a second converting circuit. The first converting circuit is electrically coupled to the first transmitting circuit, and is configured to receive a first DC voltage to generate the first AC voltage. The second converting circuit is electrically coupled to the second transmitting circuit, and is configured to receive the second AC voltage to generate a second DC voltage.

According to one embodiment of this disclosure, the first converting circuit is an inverter circuit configured to generate the first AC voltage according to the first DC voltage.

According to one embodiment of this disclosure, the second converting circuit is a rectifier circuit configured to generate the second DC voltage according to the second AC voltage.

According to one embodiment of this disclosure, the converter further includes a resonant network. The resonant network is electrically coupled between the first converting circuit and the first transmitting circuit.

According to one embodiment of this disclosure, the resonant network includes a capacitor, an inductor or a resonant unit including a capacitor and an inductor.

According to one embodiment of this disclosure, the converter further includes a resonant network. The resonant network is electrically coupled between the second converting circuit and the second transmitting circuit.

According to one embodiment of this disclosure, the converter further includes a by-pass capacitor. The by-pass capacitor is electrically coupled between the first converting circuit and the first transmitting circuit.

According to one embodiment of this disclosure, the converter further includes a by-pass capacitor. The by-pass capacitor is electrically coupled between the second converting circuit and the second transmitting circuit.

According to one embodiment of this disclosure, the converter further includes an AC-DC converter, a power adjustment module, a first control module and a second control module. The AC-DC converter is electrically coupled to an AC power source and the first converting circuit, and generates the first DC voltage to the first converting circuit according to the AC power source. The power adjustment module is electrically coupled to the second converting circuit and a load so as to adjust the second DC voltage for providing electrical energy to the load. The first control module is electrically coupled to the AC-DC converter and the first converting circuit and is configured to control the first converting circuit. The second control module is electrically coupled to the second converting circuit, the power adjustment module and the first control module, and is configured to control the second converting circuit.

According to one embodiment of this disclosure, when a resonant frequency of the first transmitting circuit and the resonant frequency the second transmitting circuit are both fr, the operating frequency of the first converting circuit or the second converting circuit is set between 0.8×fr and 1.2×fr, wherein fr is the resonant frequency corresponding to an equivalent leakage inductance and an equivalent capacitor of the first transmitting circuit or the second transmitting circuit.

According to one embodiment of this disclosure, when the resonant frequency of the first transmitting circuit and the resonant frequency of the second transmitting circuit are different, the operating frequency of the first converting circuit or the second converting circuit is set between 0.8×fr1 and 1.2×fr1 or between 0.8×fr2 and 1.2×fr2, wherein fr1 is the resonant frequency corresponding to an equivalent leakage inductance and an equivalent capacitor of the first transmitting circuit, and the fr2 is the resonant frequency corresponding to the equivalent leakage inductance and the equivalent capacitor of the second transmitting circuit.

Another aspect of this disclosure is providing a method for reducing the voltage of the node. The method is used to reduce the voltage of nodes in the internal circuit of the converter. The method for reducing the voltage of the node includes the following steps: providing a first transmitting circuit which is configured to receive a first AC voltage; providing a second transmitting circuit which is electrically coupled to the first transmitting circuit. The second transmitting circuit is configured to transmit a second AC voltage according to the first AC voltage. One of the first transmitting circuit and the second transmitting circuit includes at least one divider unit and the other one of the first transmitting circuit and the second transmitting circuit includes at least two divider units. Each of the divider units includes an inductor network and a capacitor network coupled in series. The inductor network and the capacitor network of the adjacent divider units are coupled in series alternately.

According to one embodiment of this disclosure, the inductor network includes an inductor, a transformer winding, an inductor unit having a plurality of inductors coupled in parallel or series, an inductor unit having a plurality of transformer windings coupled in parallel or series, or an inductor unit having a plurality of inductors and transformer windings.

According to one embodiment of this disclosure, the capacitor network includes a capacitor or a capacitor unit having a plurality of capacitors coupled in parallel or series.

According to one embodiment of this disclosure, inductance values of the inductor networks in each of the divider units are the same as each other.

According to one embodiment of this disclosure, inductance values of the inductor networks in each of the divider units are different from each other.

According to one embodiment of this disclosure, capacitance values of the capacitor networks in each of the divider units are different from each other.

According to one embodiment of this disclosure, capacitance values of the capacitor networks in each of the divider units are same as each other.

According to one embodiment of this disclosure, the converter further includes a first converting circuit and a second converting circuit. The first converting circuit is configured to receive a first DC voltage and generate the first AC voltage. The second converting circuit is configured to receive the second AC voltage and generate a second DC voltage. The method for reducing the voltage of the node further includes: when a resonant frequency of the first transmitting circuit and the resonant frequency the second transmitting circuit are both fr, the operating frequency of the first converting circuit or the second converting circuit is set between 0.8×fr and 1.2×fr, wherein fr is the resonant frequency corresponding to an equivalent leakage inductance and an equivalent capacitor of the first transmitting circuit or the second transmitting circuit.

According to one embodiment of this disclosure, the converter further includes a first converting circuit and a second converting circuit. The first converting circuit is configured to receive a first DC voltage and generate the first AC voltage. The second converting circuit is configured to receive the second AC voltage and generate a second DC voltage. The method for reducing the voltage of the node further includes: when the resonant frequency of the first transmitting circuit and the resonant frequency of the second transmitting circuit are different, the operating frequency of the first converting circuit or the second converting circuit is set between 0.8×fr1 and 1.2×fr1 or between 0.8×fr2 and 1.2×fr2, wherein fr1 is the resonant frequency corresponding to an equivalent leakage inductance and an equivalent capacitor of the first transmitting circuit, and the fr2 is the resonant frequency corresponding to the equivalent leakage inductance and the equivalent capacitor of the second transmitting circuit.

In summary, the present disclosure has significant advantages and performance compared with the prior art. The present disclosure has significant technology progress and high value in this industry. The present disclosure reduces the voltage of the nodes by using the AC properties of capacitor and inductor.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
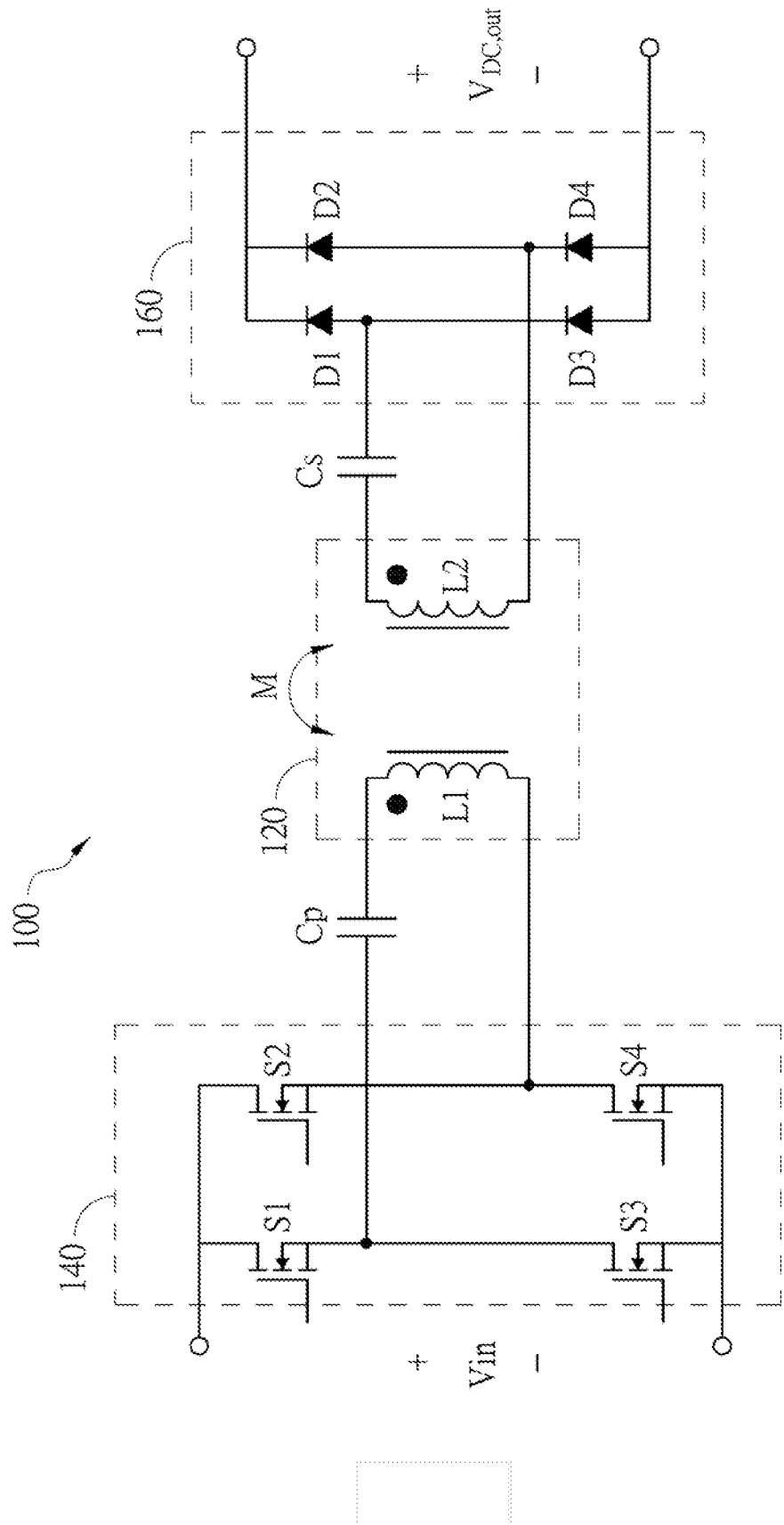
FIG. 1 is a schematic diagram of a known converter.

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

Furthermore, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 2:
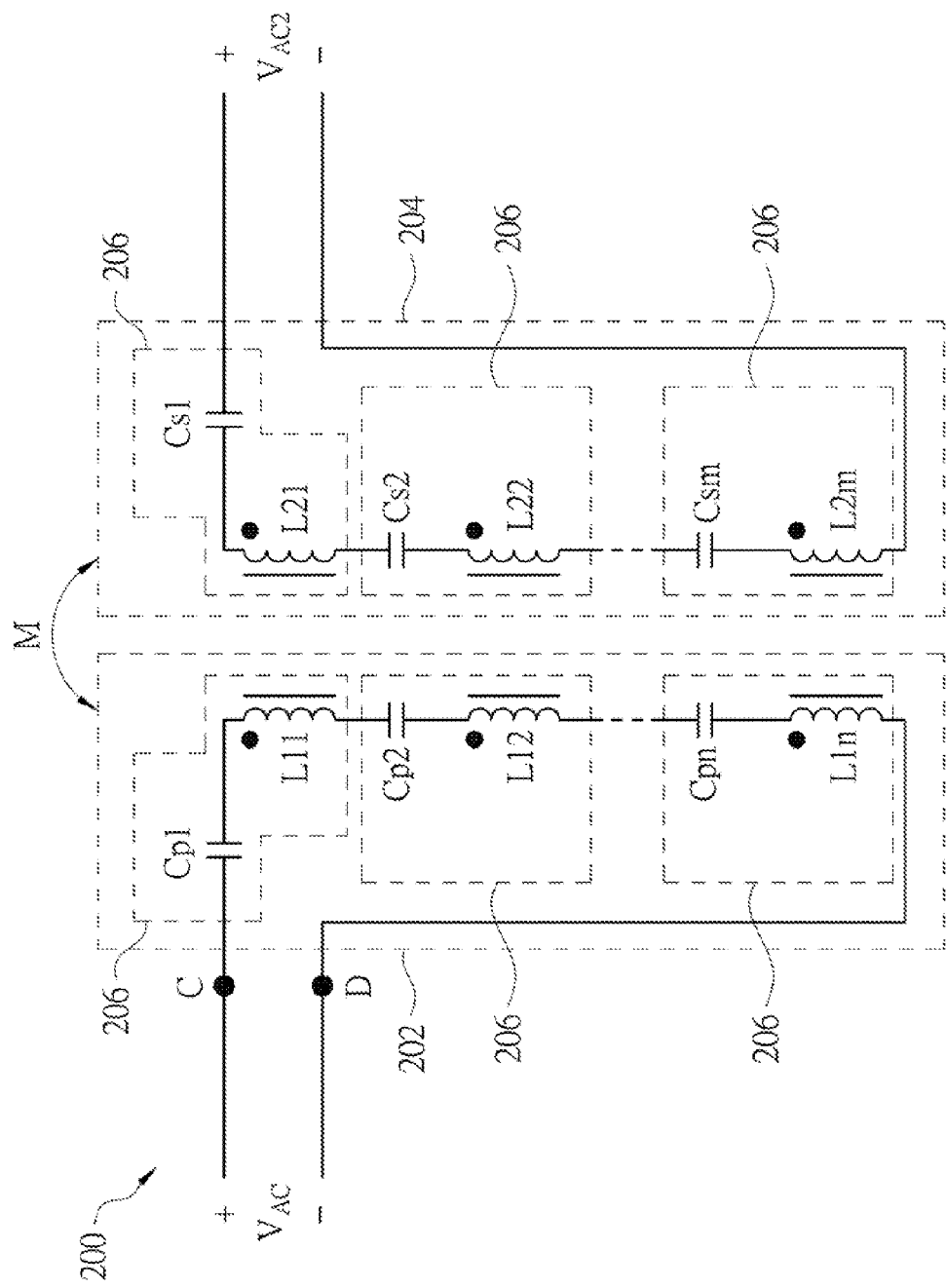
FIG. 2 is a schematic diagram of a converter according to one embodiment of this disclosure.

Referring to FIG. 2, FIG. 2 is a schematic diagram of a converter 200 according to one embodiment of this disclosure. As shown in FIG. 2, the converter 200 includes a first transmitting circuit 202 and a second transmitting circuit 204. The first transmitting circuit 202 is configured to receive an AC voltage $V_{AC}$. The second transmitting circuit 204 is electrically coupled to the first transmitting circuit 202 and the second transmitting circuit 204 is configured to generate an AC voltage $V_{AC2}$ according to the AC voltage $V_{AC}$. The first transmitting circuit 202 and the second transmitting circuit 204 include a plurality of divider units 206 respectively. One of the first transmitting circuit 202 and the second transmitting circuit 204 includes at least one divider unit 206 and the other one of the first transmitting circuit 202 and the second transmitting circuit 204 includes at least two divider units 206. The divider unit 206 of the first transmitting circuit 202 includes an inductor network L11 and the capacitor network Cp1 electrically coupled in series, the inductor network L12 and the capacitor network Cp2 electrically coupled in series, the inductor network L1n and the capacitor network Cpn electrically coupled in series and so on. The divider unit 206 of the second transmitting circuit 204 includes the inductor network L21 and the capacitor network Cs1 electrically coupled in series, the inductor network L22 and the capacitor network Cs2 in series, the inductor network L2m and the capacitor network Csm electrically coupled in series and so on. Moreover, in this embodiment, the inductor networks L11~L1n (or L21~L2m) and the capacitor networks Cp1~Cpn (or Cs1~Csm) of the adjacent divider units 206 are electrically coupled in series alternately. Each of the inductor networks L11~L1n (or L21~L2m) may include inductors coupled in series or parallel, a transformer winding, an inductor unit having inductors coupled in parallel or series, an inductor unit having transformer windings coupled in parallel or series, an inductor unit having inductors and transformer windings, etc. Each of the capacitor networks Cp1~Cpn (or Cs1~Csm) may include a capacitor or a capacitor unit having capacitors coupled in parallel/series.

Furthermore, the inductance values of the inductor networks L11~L1n (or L21~L2m) in each of the divider units 206 may be the same or different from each other. Similarly, the capacitance values of the capacitor networks Cp1~Cpn (or Cs1~Csm) in each of the divider units 206 are the same or different from each other. This disclosure is not limited to the arrangement above, a person who have skills in the art can amend the arrangement according to requirements for practical applications.

In other words, in this embodiment, for the first transmitting circuit 202 of the converter 200, the inductor networks L11~L1n and the capacitor networks Cp1~Cpn are coupled in series alternately. That is, a capacitor network is coupled between two inductor networks in series. For the second transmitting circuit 204, the inductor networks L21~L2m and the capacitor networks Cs1~Csm are coupled in series alternatively. Accordingly, the AC voltage is divided into the capacitor network Cpn (or Csm) and the inductor network L1n (or L2m), and thus the voltage between any two nodes in the first transmitting circuit 202 or the second transmitting circuit 204 of the converter 200 is reduced.

Figure 3:
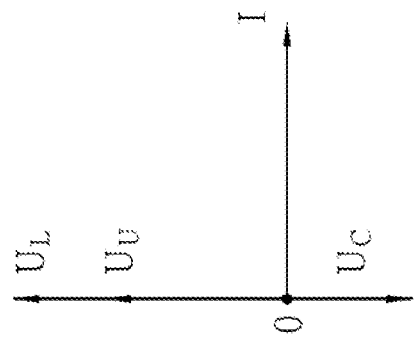
FIG. 3 is a schematic diagram of the divider unit according to one embodiment of this disclosure.
Figure 3:
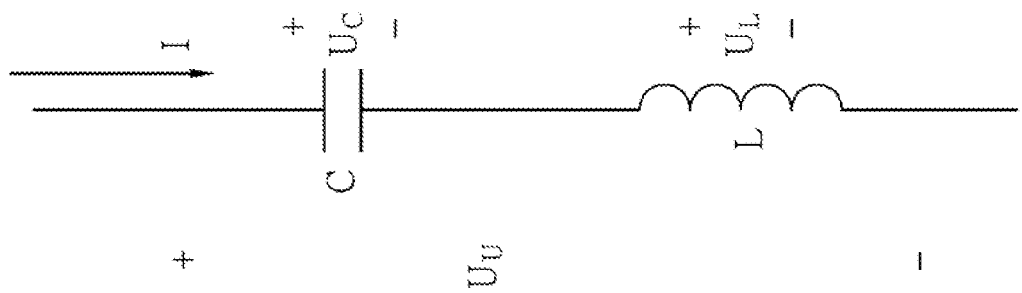

Referring to FIG. 3, FIG. 3 is a schematic diagram of the divider unit 206 according to one embodiment of this disclosure. As shown in FIG. 3, when an AC current $I_{AC}$ (i.e. I of FIG. 3) passes through the inductor network L1n (i.e. inductor L), a voltage stress $U_L$ which is 90 degrees ahead of phase of the AC current $I_{AC}$ is generated. When the AC current $I_{AC}$ passes through the capacitor network Cpn (i.e. capacitor C), a voltage stress $U_C$ which is 90 degrees behind of phase of the AC current $I_{AC}$ is generated. Therefore, the resulting equivalent voltage stress $U_U$ of the divider unit 206 is reduced. In other words, it's assumed that the AC current $I_{AC}$ has an angle frequency &J, and the equivalent impedance $Z_C$ of the capacitor network Cpn is described as following equation: $Z_C=1/(j\omega \times Cpn)=-j\omega \times (1/Cpn)$. The equivalent impedance $Z_L$ of the inductor network L1n is described as following equation: $Z_L=j\omega \times L1n$. Therefore, the total equivalent impedance $Z_L+Z_C$ of the divider unit 206 is described as following equation: $Z_L+Z_C=j\omega \times L1n-j\omega \times (1/Cpn)$. Comparing with the converter 100 having a single inductor or a single capacitor, the equivalent impedance between any two nodes in the circuit is reduced effectively by this configuration. Thus, the maximum value of the voltage between any two nodes in the circuit is reduced.

Several embodiments for the applications of the converter 200 are provided in following description to explain the function and the application above. However, this disclosure is not limited to the following embodiments.

Figure 4A:
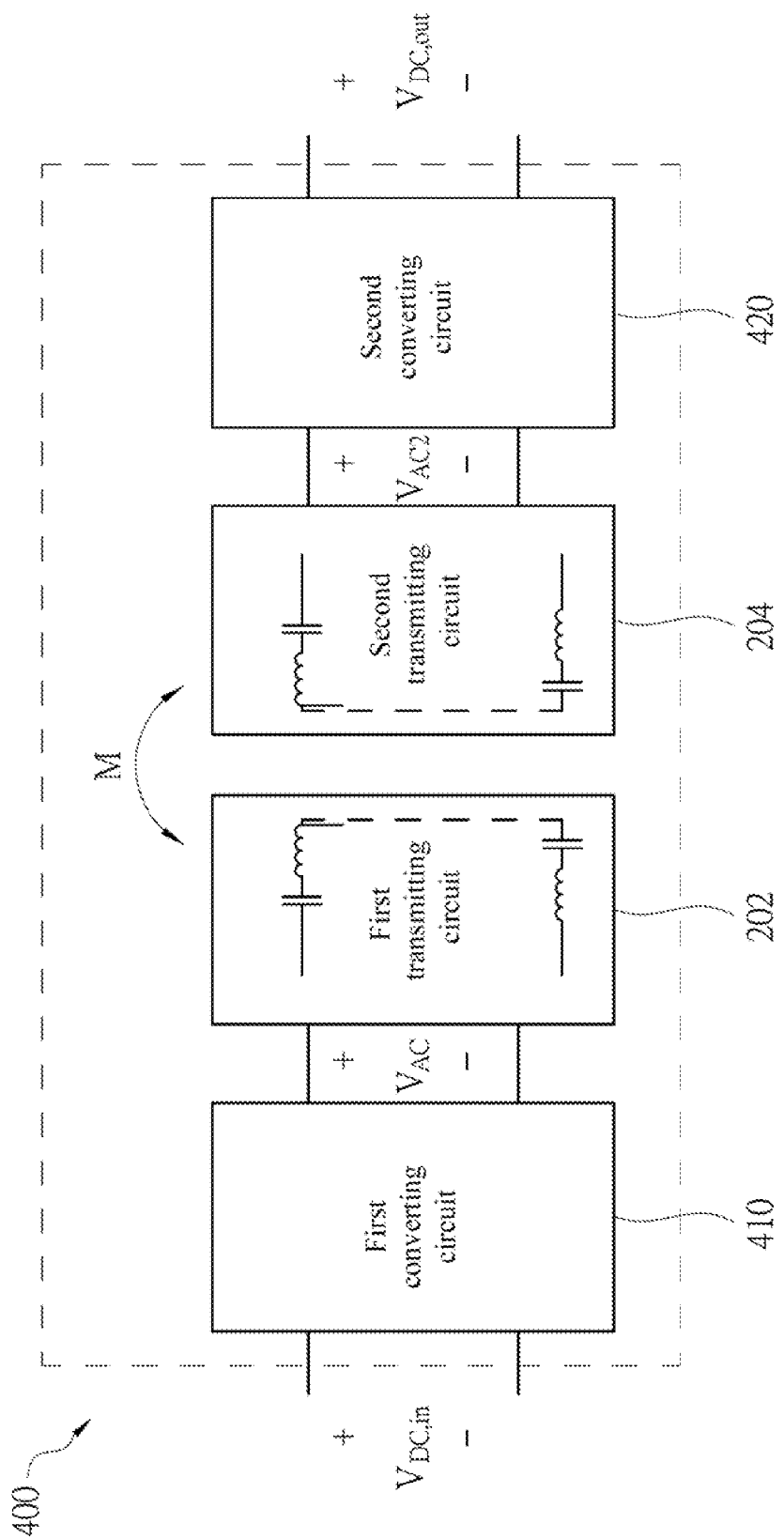
FIG. 4A is a schematic diagram of a converter according to one embodiment of this disclosure.

Referring to FIG. 4A, FIG. 4A is a schematic diagram of a converter 400 according to one embodiment of this disclosure. As shown in FIG. 4A, the converter 200 includes the first transmitting circuit 202, the second transmitting circuit 204, the first converting circuit 410 and the second converting circuit 420. The first converting circuit 410 is electrically coupled to the first transmitting circuit 202, and is configured to receive the DC voltage $V_{DC,in}$ to generate the AC voltage $V_{AC}$. For example, the first converting circuit 410 may be the full bridge inverter circuit 140 or a half bridge inverter circuit, such as the full bridge inverter circuit as shown in FIG. 1. The switches S1~S4 may be implemented with Metal-Oxide-Semiconductor Field-Effect Transistors (MOSFET), Bipolar Junction Transistors (BJT), Insulated Gate Bipolar Transistors (IGBT), etc. The second converting circuit 420 is electrically coupled to the second transmitting circuit 204, and is configured to receive the AC voltage $V_{AC2}$ to generate the DC voltage $V_{DC,out}$. The second converting circuit 420 may be a full bridge rectifier circuit or a half bridge rectifier circuit, such as the bridge rectifier 160 as shown in FIG. 1. The diodes D1~D4 may be diodes, Metal-Oxide-Semiconductor Field- Effect Transistors (MOSFET), Bipolar Junction Transistors (BJT), Insulated Gate Bipolar Transistors (IGBT), etc.

Figure 4B:
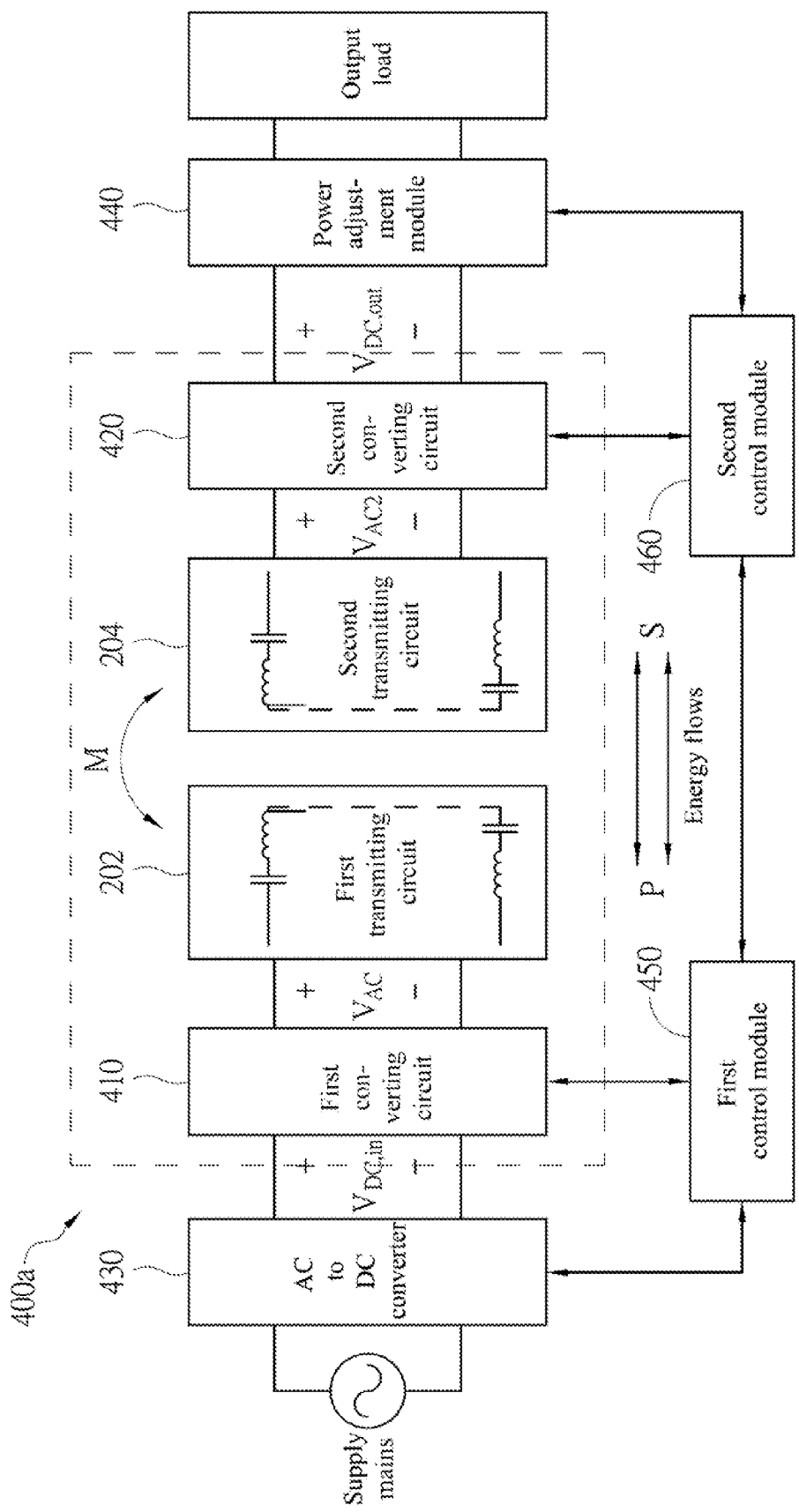
FIG. 4B is a schematic diagram of a converter according to one embodiment of this disclosure.

Referring to FIG. 4B, FIG. 4B is a schematic diagram of a converter 400a according to one embodiment of this disclosure. As shown in FIG. 4B, comparing with the converter 400 above, the converter 400a further includes the AC-DC converter 430, the power adjustment module 440, the first control module 450 and the second control module 460. The AC-DC converter 430 is electrically coupled to an AC power source (e.g. supply mains) and the first converting circuit 410. The AC-DC converter 430 is configured to generate a DC voltage $V_{DC,in}$ to the first converting circuit 410 according to the AC power source. For example, the AC-DC converter 430 may be a bridge power factor correction (PFC) circuit, a non-bridge PFC circuit, an uncontrolled rectifier circuit, etc. The first converting circuit 410 generates the AC voltage $V_{AC}$ according to the DC voltage $V_{DC,in}$. The AC voltage $V_{AC}$ is transmitted to the second converting circuit 420 through the first transmitting circuit 202 and the second transmitting circuit 204. The second converting circuit 420 generates a DC voltage $V_{DC,out}$ according to the AC voltage $V_{AC2}$. The power adjustment module 440 is electrically coupled to the second converting circuit 420 and an output load. The power adjustment module 440 is configured to adjust the DC voltage $V_{DC,out}$ so that the required power is provided to the output load. The power adjustment module 440 may be a non-isolating circuit of BUCK type, BOOST type, BOOST-BUCK type, CUK type, SEPIC type, ZETA type, etc. The power adjustment module 440 may also be an isolating circuit of full bridge type, half bridge type, forward mode, flyback type or push-pull type.

Furthermore, the first control module 450 is electrically coupled to the AC-DC converter 430 and the first converting circuit 410. The first control module 450 is configured to control the first converting circuit 410 and to adjust the AC voltage $V_{AC}$ transmitted by the first converting circuit 410. The first control module 450 is electrically coupled to the second control module 460 in order to receive the DC voltage $V_{DC,out}$ above. The communication between the first control module 450 and the second control module 460 may be of wireless type or through a cable. The second control module 460 is electrically coupled to the second converting circuit 420, the power adjustment module 440 and the first control module 450. The second control module 460 is configured to control the second converting circuit 420 according to the adjusted DC voltage $V_{DC,out}$. For example, the first control module 450 and the second control module 460 may be a pulse width modulation (PWM) module. The first control module 450 and the second control module 460 may generate different control signals to control the first converting circuit 410 and the second converting circuit 420 respectively according to the DC voltage $V_{DC,out}$. Thus, the more stable DC voltage $V_{DC,out}$ is generated.

On the other hand, the converter 400a also supports two-way energy transferring. The AC-DC converter 430 and the power adjustment module 440 both support the converter for two-way energy transferring. For example, the first converting circuit 410 and the second converting circuit 420 both consist of controllable switch components. As shown in FIG. 4B, when the energy flows from S to P, the energy of the output load is transformed into the voltage supplying the second converting circuit 420 by the power adjustment module 440. This voltage is transformed into an AC voltage with high frequency by the second converting circuit 420. The AC voltage with high frequency is transmitted to the first converting circuit 410 through the second transmitting circuit 204 and the first transmitting circuit 202. The AC voltage with high frequency is rectified into a DC voltage by the first converting circuit 410 and is transmitted to the AC-DC converter 430. This DC voltage is transformed into the AC voltage by the AC-DC converter 430 and is returned to the supply mains.

Figure 4C:
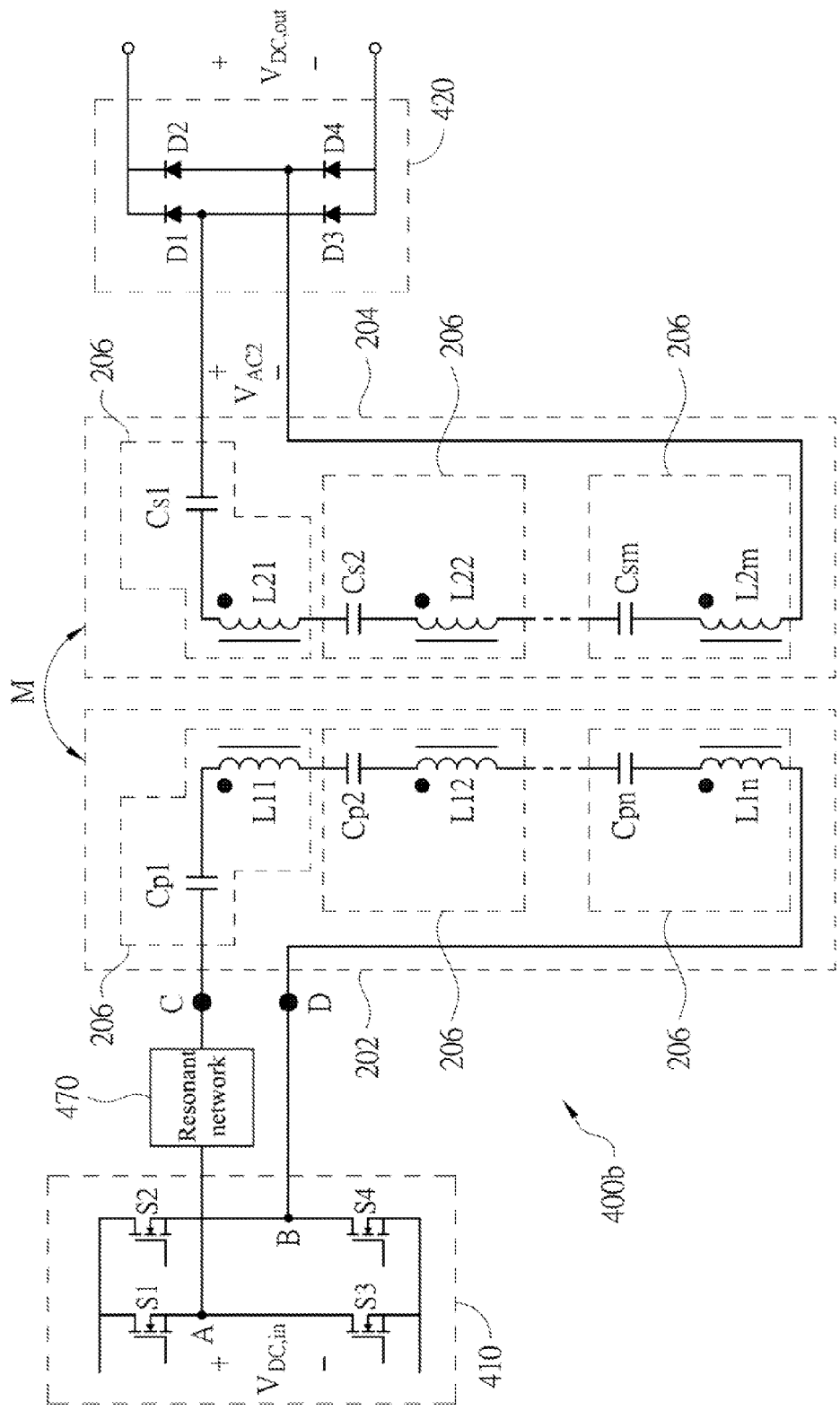
FIG. 4C is a schematic diagram of a converter with multi-compensation mechanism according to one embodiment of this disclosure.
Figure 4D:
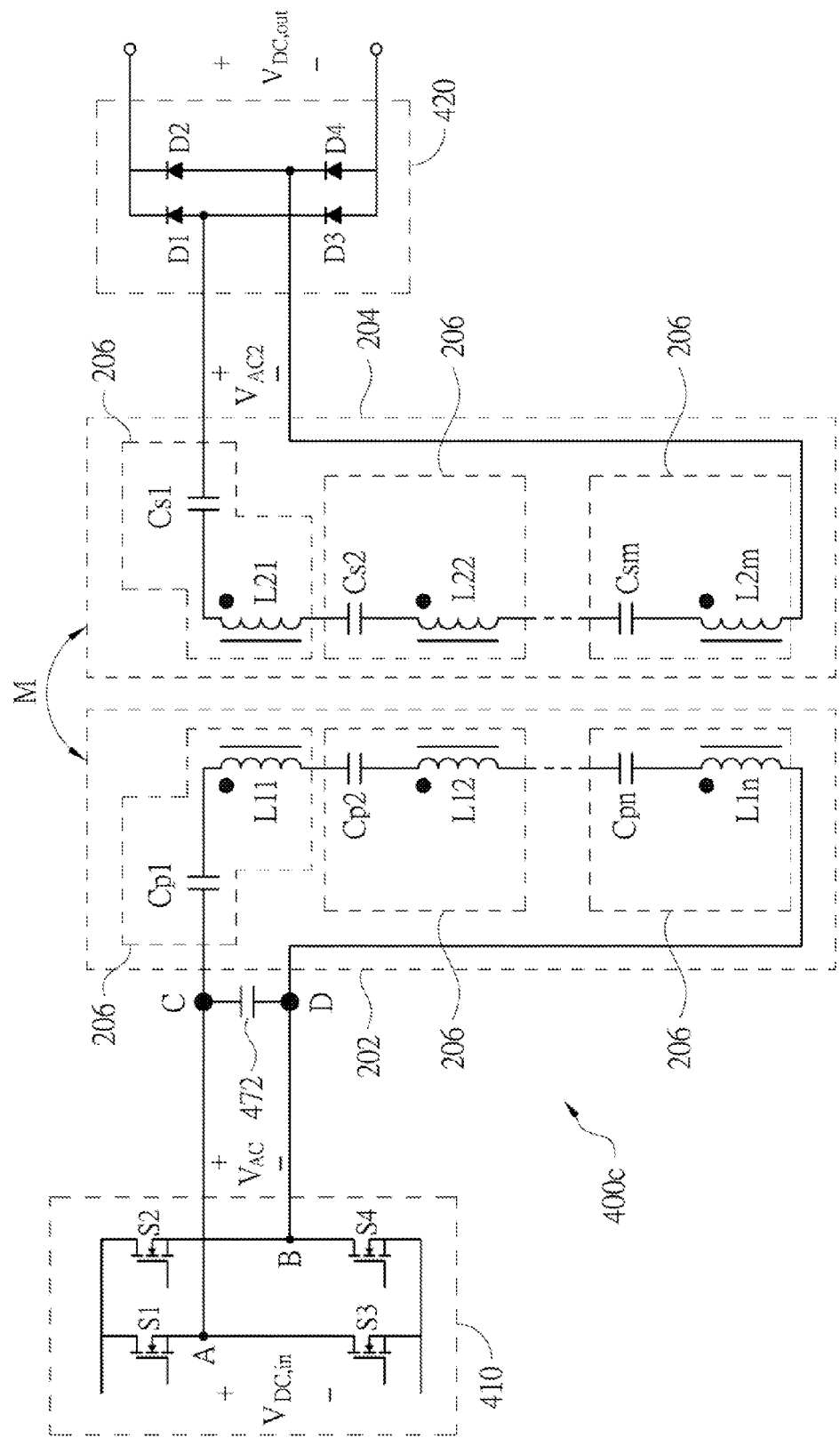
FIG. 4D is a schematic diagram of a converter with multi-compensation mechanism according to another embodiment of this disclosure.

Referring to FIG. 4C, FIG. 4C is a schematic diagram of a converter 400b with multi-compensation mechanism according to one embodiment of this disclosure. In the embodiments above, the converter 400b may further include a resonant network 470. The resonant network 470 may include a capacitor, an inductor or a resonant unit having a capacitor and an inductor. The resonant network 470 is electrically coupled between the first converting circuit 410 and the first transmitting circuit 202. In this arrangement, the input nodes C, D of the first transmitting circuit 202 may be connected to the output nodes A, B of the first converting circuit 410 through the resonant network 470. Otherwise, referring to FIG. 4D, FIG. 4D is a schematic diagram of a converter 400c with multi-compensation mechanism according to another embodiment of this disclosure. As shown in FIG. 4D, in this arrangement, the input nodes C, D of the first transmitting circuit 202 may contain an extra by-pass capacitor (e.g. capacitor 472). The by-pass capacitor is electrically coupled between the first converting circuit 410 and the first transmitting circuit 202.

On the other hand, the resonant network 470 is also adapted to the second transmitting circuit 204. That is, the resonant network 470 may be electrically coupled between the second converting circuit 420 and the second transmitting circuit 204. For example, the by-pass capacitor (e.g. capacitor 472) is disposed between the second converting circuit 420 and the second transmitting circuit 204. In brief, the converter 400 of this embodiment may be applied to a compensation circuit with architecture of "primary side series, secondary side series" (as shown in FIG. 1), "primary side multi-compensation, secondary side series" (as shown in FIG. 4C), "primary side series, secondary side multi-compensation", and "primary side multi-compensation, secondary side multi-compensation", etc.

Figure 5A:
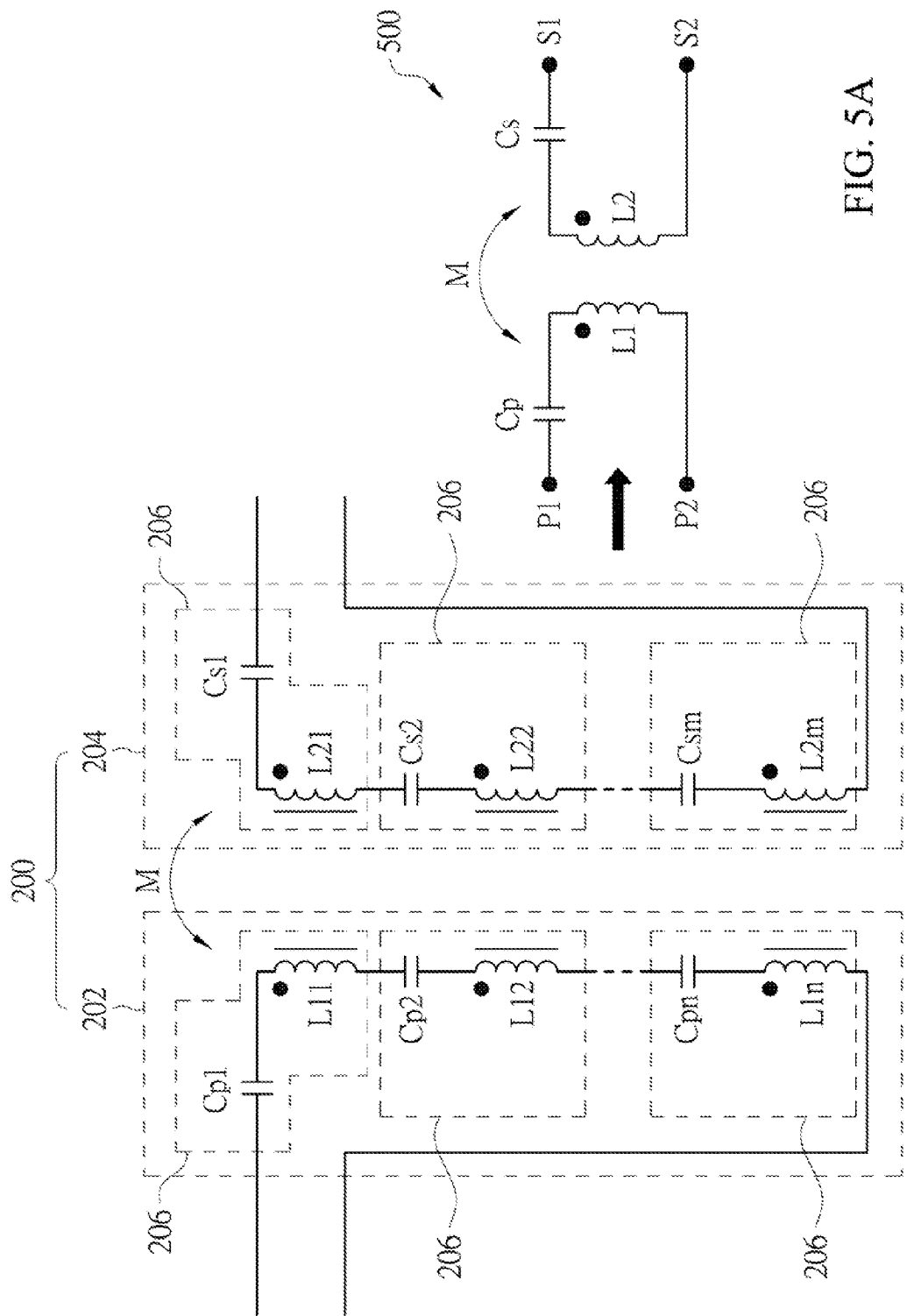
FIG. 5A is a schematic diagram of an equivalent model for the converter according to one embodiment of this disclosure.

Referring to FIG. 5A, FIG. 5A is a schematic diagram of an equivalent model for the converter 200 according to one embodiment of this disclosure. As shown in FIG. 5A, the converter 200 can be considered as equivalent to the converter 500. The equivalent capacitor Cp is equal to Cp1+Cp2+ . . . +Cpn, and the equivalent capacitor Cs is equal to Cs1+Cs2+ . . . +Csm. The equivalent inductor L1 and the equivalent inductor L2 are measured by the method as follows: replacing the capacitor networks Cp1 . . . Cpn of the first transmitting circuit 202 with wires, and keeping the second transmitting circuit 204 open, and then measuring the inductance of the first transmitting circuit 202 to obtain the equivalent inductor L1. Similarly, the capacitor networks Cs1 . . . Csm of the second transmitting circuit 204 are replaced by wires, the first transmitting circuit 202 keeps open, and then the inductance of the second transmitting circuit 204 is measured to obtain the equivalent inductor L2.

Moreover, the mutual inductance M of the converter 500 may be measured based on the two-port theory, which may include following steps: the capacitor networks Cp1, . . . Cpn, Cs1, . . . Csm of the first transmitting circuit 202 and the second transmitting circuit 204 are replaced by wires. Node P1 is connected to node S1, and the inductance is measured as L3 through nodes P2 and S2. Node P1 is connected to node S2, and the inductance is measured as L4 through nodes P2 and S1. The mutual inductance M is |L3−L4|/4. The equivalent leakage inductance Lr1 corresponding to the first transmitting circuit 202 is equal to $L1(1-M/(L1 \times L2)^{1/2})$. The equivalent leakage inductance Lr2 corresponding to the first transmitting circuit 204 is equal to $Lr2=L2(1-M/(L1 \times L2)^{1/2})$.

In addition, the equivalent capacitor Cp of the first transmitting circuit 204 and the equivalent capacitor Cs of the second transmitting circuit 202 are measured by the method as follows: replacing the inductor networks L11 ... L1n of the first transmitting circuit 202 are replaced with wires, and then measuring the capacitance of the first transmitting circuit 202 to obtain the equivalent capacitor Cp. Similarly, the inductor networks L21 ... L2n of the second transmitting circuit 204 are replaced by wires, and then the capacitance of the second transmitting circuit 204 is measured to obtain the equivalent capacitor Cs.

Figure 5B:
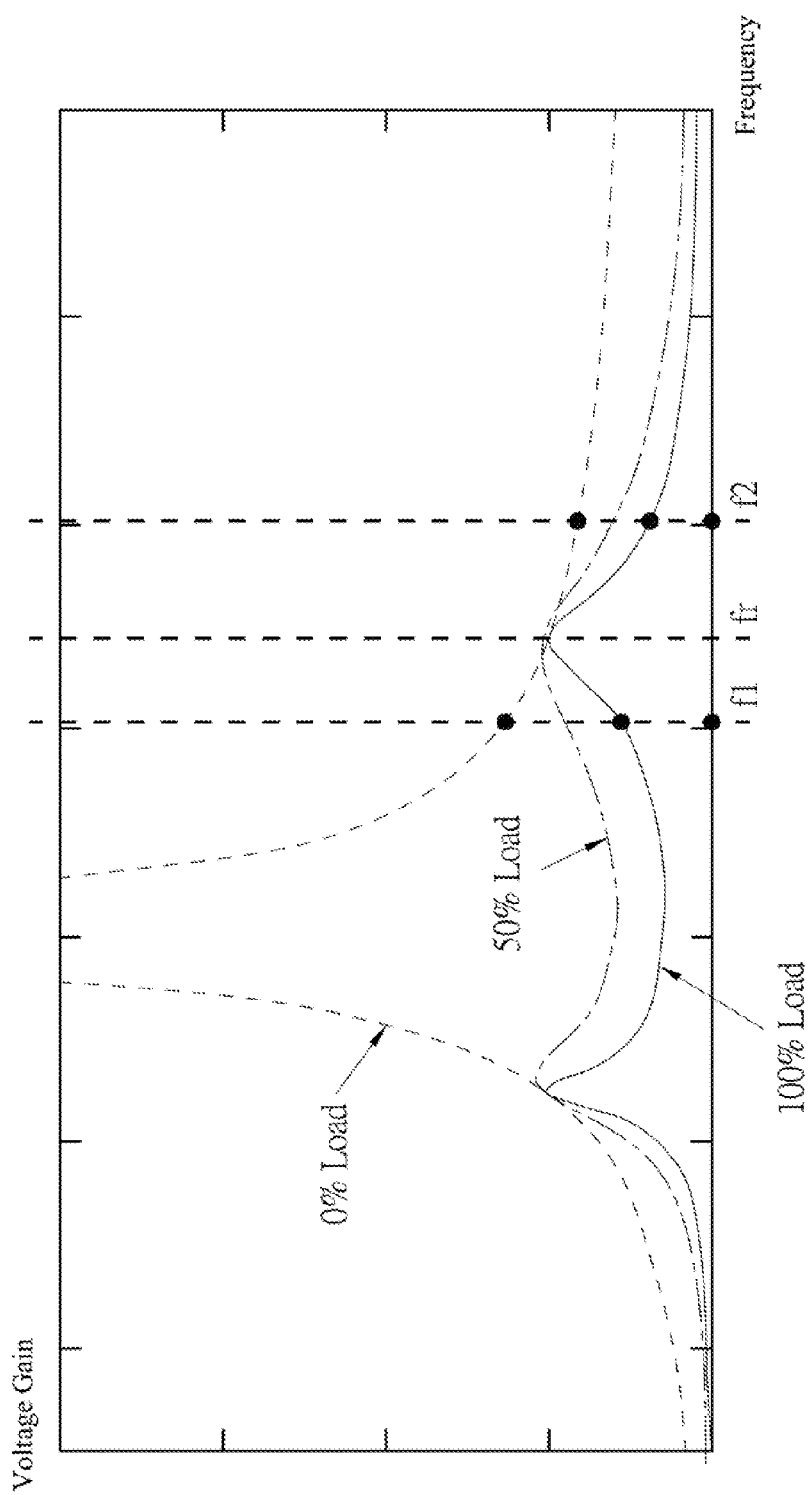
FIG. 5B is a schematic diagram illustrating relation of an operating frequency and the voltage gain for the converter according to one embodiment of this disclosure.

Referring to FIG. 5B, FIG. 5B is a schematic diagram illustrating relation of an operating frequency and the voltage gain for the converter 400 according to one embodiment of this disclosure. As shown in FIG. 5B, the horizontal ordinate represents the operating frequency of the converter 400, (i.e., the operating frequency of the first converting circuit 410 and the second converting circuit 420 in the converter 400), and the vertical ordinate represents the voltage gain (i.e. the ratio of output voltage and input voltage, for example, the ratio of the DC voltage $V_{DC,out}$ and the DC voltage $V_{DC,in}$). When the converter 400 is operated in f1 or f2, the voltage gain with no load is twice as many as the voltage gain with full load. When the converter 400 is operated in the resonant frequency fr and, the output voltage is almost not changed whether the output load is in the status of no or full. The resonant frequency fr, corresponding to the equivalent leakage inductance Lr1 and the equivalent capacitor Cp of the first transmitting circuit 202, is equal to the resonant frequency, corresponding to the equivalent leakage inductance Lr2 and the equivalent capacitor Cs of the second transmitting circuit 204. That is, fr=½π (Lr1*Cp) ½=½π(Lr2*Cs) ½. In other words, fr is the resonant frequency corresponding to the equivalent leakage inductance and the equivalent capacitor of the first transmitting circuit 202 or the second transmitting circuit 204. Therefore, in the embodiments above, the operating frequency of the first converting circuit 410 or the second converting circuit 420 may be set between 0.8×fr and 1.2×fr to obtain a more stable voltage gain. However, if the resonant frequency corresponding to the equivalent leakage inductance Lr1 and the equivalent capacitor Cp of the first transmitting circuit 202 is not equal to the resonant frequency corresponding to the equivalent leakage inductance Lr2 and the equivalent capacitor Cs of the second transmitting circuit 204, the operating frequency of the first converting circuit 410 or the second converting circuit 420 is set between 0.8×fr1 and 1.2×fr1 or between 0.8×fr2 and 1.2×fr2 (i.e. the range of f1~f2 in FIG. 5b), wherein fr1 is the resonant frequency corresponding to the equivalent leakage inductance Lr1 and the equivalent capacitor Cp of the first transmitting circuit 202 and fr2 is the resonant frequency corresponding to the equivalent leakage inductance Lr2 and the equivalent capacitor Cs of the second transmitting circuit 204.

It should be noted that, in the embodiment of FIG. 4B, because the converter 400a supports two-way energy transferring, the operating frequency of the first converting circuit 410 may be set in the aforementioned range of the operating frequency when the energy flows from P to S. Conversely, when the energy flows from S to P, the operating frequency of the second converting circuit 420 may be set as the range above. Accordingly, the converter 400a has a more stable voltage gain in the operation of two-way energy transferring.

Figure 6:
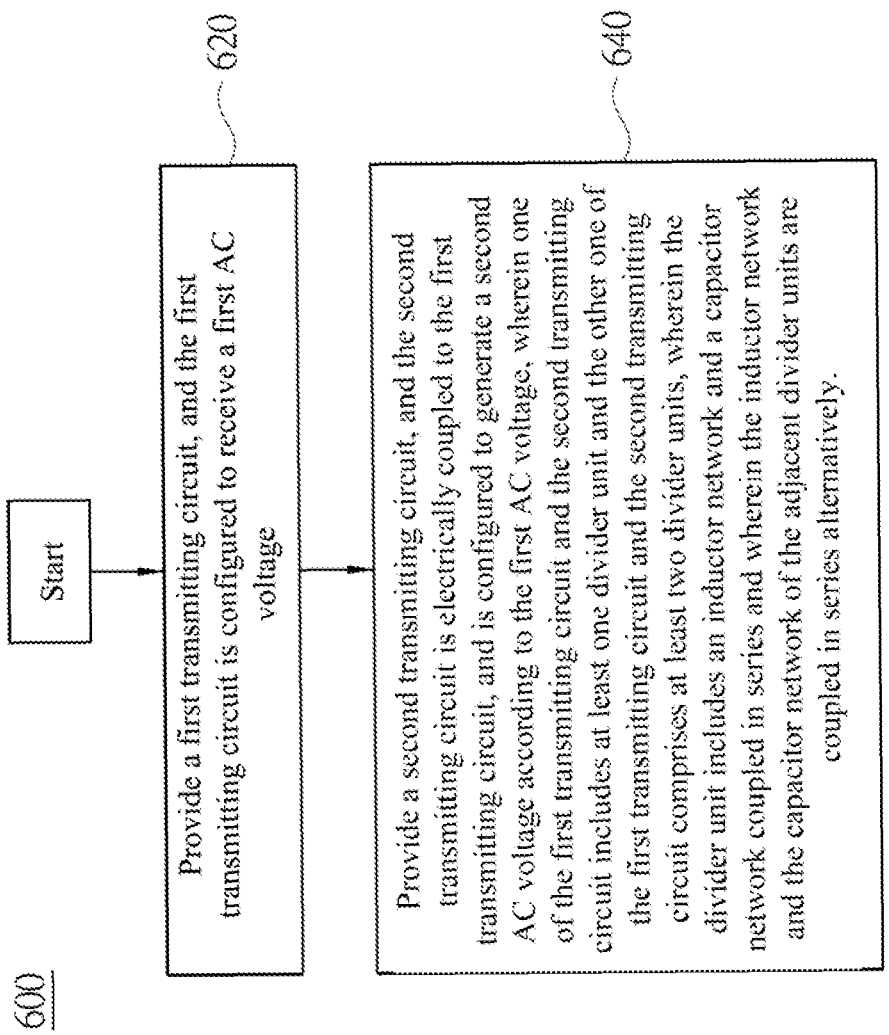
FIG. 6 is a flow chart of a method for reducing voltage of node according to one embodiment of this disclosure.

Another aspect of this disclosure is providing a method for reducing the voltage of the node. Referring to FIG. 6, FIG. 6 is a flow chart of a method for reducing voltage of node according to one embodiment of this disclosure. As shown in FIG. 6, the method 600 is configured to reduce the voltage of nodes in internal circuit of the converter. The method 600 includes steps 620 and 640.

In step 620, the first transmitting circuit is provided and is configured to receive the first AC voltage.

In step 640, the second transmitting circuit is provided and is electrically coupled to the first transmitting circuit. The second transmitting circuit is configured to generate the second AC voltage according to the first AC voltage. One of the first transmitting circuit and the second transmitting circuit includes at least one divider unit and the other one of the first transmitting circuit and the second transmitting circuit includes at least two divider units. Each of the divider units includes an inductor network and a capacitor network coupled in series. The inductor network and the capacitor network of adjacent divider units are coupled in series alternately.

For example, referring to FIG. 2, one of the first transmitting circuit 202 and the second transmitting circuit 204 includes at least one divider unit 206 and the other one of the first transmitting circuit 202 and the second transmitting circuit 204 includes at least two divider units 206. The divider unit 206 of the first transmitting circuit 202 includes plural capacitor network Cp1~Cpn and inductor networks L11~L1n. The divider unit 206 of the second transmitting circuit 204 includes plural capacitor network Cs1~Csm and inductor networks L21~L2m. The capacitance values of the capacitor networks Cp1~Cpn, Cs1~Csm may be the same or different each other. Similarly, the inductance values of the inductor networks L11~L1n, L21~L2m may be the same or different each other. The voltage between any two nodes in the circuit is reduced effectively by this arrangement.

Furthermore, in step 620, the capacitor networks Cp1~Cpn, Cs1~Csm may include a capacitor or a capacitor unit having capacitors coupled in parallel or series. In step 620, the inductor networks L11~L1n, L21~L2m may include inductors coupled in series/parallel, a transformer windings, an inductor unit having inductors coupled in parallel/series, an inductor unit having transformer windings coupled in parallel or series, or an inductor unit having inductors and transformer windings.

Further, referring to FIG. 5B, in order to obtain a more stable voltage gain, when the resonant frequency of the first converting circuit and that of the second converting circuit are both fr, the operating frequency of the converter (e.g. the operating frequency of the first converting circuit 410 or the second converting circuit 420) may be set between 0.8×fr and 1.2×fr. The fr is the resonant frequency corresponding to the equivalent leakage inductance and the equivalent capacitor of the first transmitting circuit or the second transmitting circuit.

Alternatively, when the resonant frequency of the first converting circuit and the resonant frequency of the second converting circuit are different, the operating frequency of the converter (e.g. the operating frequency of the first converting circuit 410 or the second converting circuit 420) may be between 0.8×fr1 and 1.2×fr1 or between 0.8×fr2 and 1.2×fr2. The fr1 is the resonant frequency corresponding to the equivalent leakage inductance and the equivalent capacitor of the first transmitting circuit. The fr2 is the resonant frequency corresponding to the equivalent leakage inductance and the equivalent capacitor of the second transmitting circuit.

In summary, the converter of this disclosure reduces the voltage of the nodes by the AC properties of capacitor and inductor. No matter what status the output power is in a normal or in higher status, the maximum value of the voltage between any two nodes in the circuit is reduced effectively. Thus the safety of the operation of the converter is enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A converter, comprising:
a first transmitting circuit configured to receive a first AC voltage; and
a second transmitting circuit electrically coupled to the first transmitting circuit and configured to generate a second AC voltage according to the first AC voltage,
wherein one of the first transmitting circuit and the second transmitting circuit comprises at least one divider unit and the other one of the first transmitting circuit and the second transmitting circuit comprises at least two divider units, wherein the divider unit includes an inductor network and a capacitor network coupled in series, and wherein the inductor network and the capacitor network of the adjacent divider units are coupled in series alternately;
wherein the converter further comprising:
a first converting circuit electrically coupled to the first transmitting circuit,
and configured to receive a first DC voltage to generate the first AC voltage;
and a second converting circuit electrically coupled to the second transmitting circuit, and configured to receive the second AC voltage to generate a second DC voltage,
wherein when a resonant frequency of the first transmitting circuit and the resonant frequency the second transmitting circuit are both fr, the operating frequency of the first converting circuit or the second converting circuit is set between 0.8×fr and 1.2×fr, wherein fr is the resonant frequency corresponding to an equivalent leakage inductance and an equivalent capacitor of the first transmitting circuit or the second transmitting circuit.

2. The converter of claim 1, wherein the inductor network comprises an inductor, a transformer winding, an inductor unit having a plurality of inductors coupled in parallel or series, an inductor unit having a plurality of transformer windings coupled in parallel or series, or an inductor unit having a plurality of inductors and transformer windings.

3. The converter of claim 1, wherein the capacitor network comprises a capacitor or a capacitor unit having a plurality of capacitors coupled in parallel or series.

4. The converter of claim 1, wherein inductance values of the inductor networks in each of the divider units are the same as each other.

5. The converter of claim 1, wherein inductance values of the inductor networks in each of the divider units are different from each other.

6. The converter of claim 1, wherein capacitance values of the capacitor networks in each of the divider units are the same as each other.

7. The converter of claim 1, wherein capacitance values of the capacitor networks in each of the divider units are different from each other.

8. The converter of claim 1, wherein the first converting circuit comprises an inverter circuit configured to generate the first AC voltage according to the first DC voltage.

9. The converter of claim 1, wherein the second converting circuit comprises a rectifier circuit configured to generate the second DC voltage according to the second AC voltage.

10. The converter of claim 1, further comprising:
a resonant network electrically coupled between the first converting circuit and the first transmitting circuit.

11. The converter of claim 10, wherein the resonant network comprises a capacitor, an inductor or a resonant unit comprising a capacitor and an inductor.

12. The converter of claim 1, further comprising:
a resonant network electrically coupled between the second converting circuit and the second transmitting circuit.

13. The converter of claim 1, further comprising:
a by-pass capacitor electrically coupled between the first converting circuit and the first transmitting circuit.

14. The converter of claim 1, further comprising:
a by-pass capacitor electrically coupled between the second converting circuit and the second transmitting circuit.

15. The converter of claim 1, further comprising:
an AC-DC converter electrically coupled to an AC power source and the first converting circuit, wherein the AC-DC converter generates the first DC voltage to the first converting circuit according to the AC power source;
a power adjustment module electrically coupled to the second converting circuit and a load, so as to adjust the second DC voltage for providing an electrical energy to the load;
a first control module electrically coupled to the AC-DC converter and the first converting circuit, and configured to control the first converting circuit; and
a second control module electrically coupled to the second converting circuit, the power adjustment module and the first control module, and
configured to control the second converting circuit.

16. The converter of claim 1, wherein when the resonant frequency of the first transmitting circuit and the resonant frequency of the second transmitting circuit are different, the operating frequency of the first converting circuit or the second converting circuit is set between 0.8×fr1 and 1.2×fr1 or between 0.8×fr2 and 1.2×fr2, wherein fr1 is the resonant frequency corresponding to an equivalent leakage inductance and an equivalent capacitor of the first transmitting circuit, and the fr2 is the resonant frequency corresponding to the equivalent leakage inductance and the equivalent capacitor of the second transmitting circuit.

17. A method for reducing the voltage of the node, wherein the method is configured to reduce the voltage of nodes in an internal circuit of the converter, comprising:
providing a first transmitting circuit, wherein the first transmitting circuit is to configured to receive a first AC voltage; and
providing a second transmitting circuit, wherein the second transmitting circuit is electrically coupled to the first transmitting circuit, and is configured to generate a second AC voltage according to the first AC voltage;
wherein one of the first transmitting circuit and the second transmitting is circuit comprises at least one divider unit and the other one of the first transmitting circuit and the second transmitting circuit comprises at least two divider units, wherein the divider unit includes an inductor network and a capacitor network coupled in series and wherein the inductor network and the capacitor network of the adjacent divider units are coupled in series alternately;

wherein the converter further comprises a first converting circuit and a second converting circuit, wherein the first converting circuit is configured to receive a first DC voltage to generate the first AC voltage, and the second converting circuit is configured to receive the second AC voltage to generate a second DC voltage, the method further comprising:

when a resonant frequency of the first transmitting circuit and the resonant frequency of the second transmitting circuit are both fr, an operating frequency of the first converting circuit or the second converting circuit is set between 0.8×fr and 1.2×fr, wherein the fr is the resonant frequency corresponding to an equivalent leakage inductance and an equivalent capacitor of the first transmitting circuit or the second transmitting circuit.

18. The method of claim 17, wherein the inductor network comprises an inductor, a transformer winding, an inductor unit having a plurality of inductors coupled in parallel or series, an inductor unit having a plurality of transformer windings coupled in parallel or series, or an inductor unit having a plurality of inductors and transformer windings.

19. The method of claim 17, wherein the capacitor network comprises a capacitor or a capacitor unit having a plurality of capacitors coupled in parallel or series.

20. The method of claim 17, wherein inductance values of the inductor networks in each of the divider units are different from each other.

21. The method of claim 17, wherein inductance values of the inductor networks in each of the divider units are the same as each other.

22. The method of claim 17, wherein capacitance values of the capacitor networks in each of the divider units are the same as each other.

23. The method of claim 17, wherein capacitance values of the capacitor networks in each of the divider units are different from each other.

24. The method of claim 17, wherein the converter further comprises a first converting circuit and a second converting circuit, wherein the first converting circuit is configured to receive a first DC voltage to generate the first AC voltage, wherein the second converting circuit is configured to receive the second AC voltage to generate a second DC voltage, the method further comprising:

when a resonant frequency fr1 of the first transmitting circuit and the resonant frequency fr2 of the second transmitting circuit are different, an operating frequency of the first converting circuit or the second converting circuit is set between 0.8×fr1 and 1.2×fr1 or between 0.8×fr2 and 1.2×fr2, wherein the fr1 is a resonant frequency corresponding to an equivalent leakage inductance and an equivalent capacitor of the first transmitting circuit, and wherein the fr2 is the resonant frequency corresponding to the equivalent leakage inductance and the equivalent capacitor of the second transmitting circuit.

* * * * *